US012417033B2

(12) United States Patent
Kayser et al.

(10) Patent No.: US 12,417,033 B2
(45) Date of Patent: Sep. 16, 2025

(54) SLOW PROGRAMMING ON WEAK WORD LINES OF A MEMORY DEVICE

(71) Applicant: Sandisk Technologies, Inc., Milpitas, CA (US)

(72) Inventors: Scott Kayser, San Jose, CA (US); Yongke Sun, Pleasanton, CA (US); Lanlan Gu, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 199 days.

(21) Appl. No.: 18/357,737

(22) Filed: Jul. 24, 2023

(65) Prior Publication Data
US 2024/0377963 A1  Nov. 14, 2024

Related U.S. Application Data

(60) Provisional application No. 63/501,758, filed on May 12, 2023.

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)
(58) Field of Classification Search
CPC .... G06F 3/0619; G06F 3/0653; G06F 3/0679; G11C 16/14; G11C 16/34; G11C 16/3404
USPC .................................................. 365/185.09
See application file for complete search history.

(56) References Cited

U.S. PATENT DOCUMENTS

| | | | |
|---|---|---|---|
| 8,630,118 B2 | 1/2014 | Sakai et al. | |
| 9,224,495 B2 | 12/2015 | Jung et al. | |
| 10,002,042 B2 | 6/2018 | Alrod et al. | |
| 10,402,247 B2 | 9/2019 | Lim et al. | |
| 10,410,732 B1* | 9/2019 | Eliash | G11C 29/025 |
| 2022/0301645 A1 | 9/2022 | Banerjee et al. | |
| 2022/0334902 A1* | 10/2022 | Li | G11C 11/5671 |
| 2024/0256444 A1* | 8/2024 | Xu | G06F 12/0246 |

FOREIGN PATENT DOCUMENTS

CN    114115716 A  *  3/2022  .......... G06F 11/2094

OTHER PUBLICATIONS

Namala et al., Mar. 1, 2022, all pages.*

* cited by examiner

*Primary Examiner* — Fernando Hidalgo
(74) *Attorney, Agent, or Firm* — DENTONS Durham Jones Pinegar

(57) ABSTRACT

A slow programming audit is performed on one or more memory blocks and/or associated word lines of one or more memory dies. The slow programming audit is used to determine whether identified or known weak word lines of one or more memory dies are causing performance issues. If it is determined that the weak word lines are causing data read, data write and/or data retention issues, the weak word lines of the one or more memory dies are marked for slow programming in subsequent programming operations.

20 Claims, 5 Drawing Sheets

SLOW PROGRAMMING ON WEAK WORD LINES OF A MEMORY DEVICE

CROSS-REFERENCE TO RELATED APPLICATIONS

The present application claims priority to U.S. Provisional Application 63/501,758 entitled "SLOW PROGRAMMING ON WEAK WORD LINES OF A MEMORY DEVICE", filed May 12, 2023, the entire disclosure of which is hereby incorporated by reference in its entirety.

BACKGROUND

A memory die of a non-volatile storage device typically includes an array of memory cells arranged in rows and columns. A word line is used to select a particular row of memory cells during a write operation, in which data is written to the memory cells, and during a read operation, in which data is read from the memory cells.

However, voltage threshold characteristics and/or error/failure characteristics (e.g., a failed bit count) of the various word lines of the memory die may not be uniform. For example, one word line may have a higher failed bit count when compared to a failed bit count of another word line. The difference between word lines may be the result of process variations or particular design considerations of the memory die.

Word lines that have higher error/failure characteristics and/or voltage threshold characteristics can cause performance and reliability concerns. For example, word lines with a high failed bit count may cause excessive read recoveries to be invoked. In another example, data stored on the weak word lines may not be recoverable at all.

Accordingly, it would be beneficial to identify weak word lines of a memory die. Once the weak word lines of the memory die are identified, it would be beneficial to perform programming operations on the memory cells associated with the weak word lines in such a way as to reduce the performance and reliability concerns outlined above.

SUMMARY

As briefly described above, various word lines of a memory die of a non-volatile storage device may have different voltage threshold characteristics and/or error/failure characteristics which may cause performance and/or reliability issues. In order to address these issues, the present application describes using slow programming operations on identified weak word lines of a memory die. However, slow programming operations may increase latency costs and impact performance consistency of the memory die. Therefore, it may be desirable to selectively apply slow programming on one or more of the identified weak word lines of the memory die.

The determination as to whether to implement slow programming on one or more weak word lines of a particular memory die may be based on a slow programming audit. The slow programming audit may be used to determine performance metrics (e.g., a failed bit count) of each identified weak word line. If the performance metrics of the identified weak word lines exceed a performance metric threshold, the memory die may be marked as a candidate for slow programming operations. As such, slow programming may be implemented for subsequent programming operations that are performed on the identified weak word lines of the memory die.

Accordingly, the present disclosure describes a method that includes identifying one or more weak word lines of a memory die. Once the weak word lines have been identified, one or more memory blocks associated with each of the one or more weak word lines are selected. A performance metric of each of the one or more weak word lines and the associated one or more memory blocks is determined. A determination is then made as to whether the performance metric of each of the one or more weak word lines, and the associated one or more memory blocks, exceeds a performance metric threshold. Based on determining that the performance metric of each of the one or more weak word lines, and the associated one or more memory blocks, exceeds the performance metric threshold, the memory die is identified as a candidate for slow programming operations.

The present disclosure also describes a data storage device that includes one or more memory dies and a controller. In an example, the controller is communicatively coupled to the one or more memory dies and is operable to monitor programming operations performed on each memory die of the one or more memory dies. Based on a determination that a number of programming operations performed on at least one memory die of the one or more memory dies exceeds a programming operation threshold, the controller identifies at least one weak word line associated with the at least one memory die of the one or more memory dies. The controller may also select one or more memory blocks associated with the at least one weak word line and determine a failed bit count of the at least one weak word line and the one or more memory blocks associated with the at least one weak word line. The controller may also determine whether the failed bit count exceeds a failed bit count threshold. Based on a determination that the failed bit count exceeds the failed bit count threshold, the controller identifies the at least one memory die as a candidate for slow programming operations.

A non-volatile storage device is also described. In an example, the non-volatile storage device includes one or more memory dies. The non-volatile storage device may also include means for identifying one or more weak word lines associated with each of the one or more memory dies and means for selecting one or more memory blocks associated with each of the one or more weak word lines. The non-volatile storage device may also include means for determining a performance metric associated with each of the one or more weak word lines and the associated one or more memory blocks. In an example, the non-volatile storage device also includes means for identifying at least one memory die of the one or more memory dies as a candidate for slow programming operations based, at least in part, on a determination that the performance metric associated with each of the one or more weak word lines of the at least one memory die exceeds a performance metric threshold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
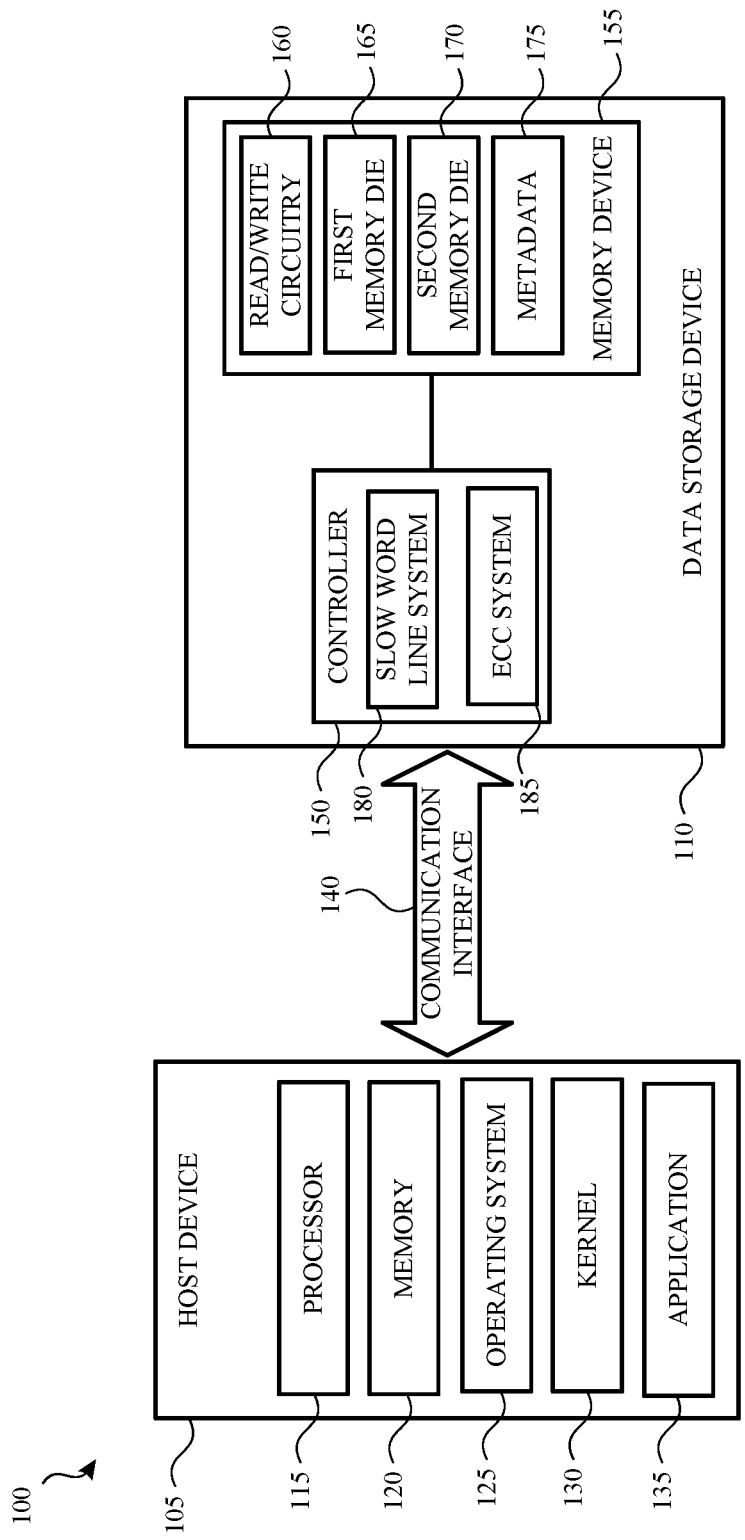
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Examples described herein are directed to systems and methods for identifying weak word lines and selectively and/or adaptively applying slow programming to the weak word lines during subsequent programming operations. In an example, a weak word line is a word line that has weak or degraded electrical characteristics when compared to other word lines of a memory die. For example, one word line may have different a voltage threshold and/or error/failure rates or characteristics when compared with other word lines of the memory die. Some word lines may be weaker than other word lines due to process and fabrication variations, wear and tear and/or the design architecture of the memory die.

Weak word lines may cause performance and/or reliability issues. For example, a weak word line may not be able to provide sufficient voltage to activate all of the memory cells on a particular row of a memory block of the memory die. As a result, read and/or write performance of a memory block associated with the weak word line and/or the memory die itself, may be negatively impacted. This may especially be true during high stress conditions such as when data is stored by the memory die for a long period of time. For example, a weak word line may cause excessive read recoveries to be initiated by the memory die. In another example, weak word lines may render stored data completely unrecoverable.

In order to address the above, the present application describes performing a slow programming audit on one or more memory blocks and/or associated word lines of one or more memory dies. The slow programming audit may be used to determine whether identified or known weak word lines of one or more particular memory dies are causing performance issues. If it is determined that the weak word lines are causing (or could potentially cause) data read, data write and/or data retention issues, the memory die may be marked or otherwise identified as a candidate for slow programming. Being marked as a candidate for slow programming causes subsequent programming operations performed on the weak word lines of the candidate memory die to be performed at a lower rate when compared to other programming operations performed on other word lines of the memory die. In an example, slow programming is performed on all memory blocks associated with the weak word lines of the memory die.

In accordance with the above, many technical benefits may be realized including, but not limited to increasing a reliability of memory dies having weak word lines while minimizing latency costs and increasing performance consistency of one or more memory blocks and/or word lines of the memory die.

These benefits, along with other examples, will be shown and described in greater detail with respect to FIG. 1-FIG. 5.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 can be used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 may create a virtual address space for the application 135 and/or other processes executed by the processor 115. The virtual address space may map to locations in the memory 120. The operating system 125 may also include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 may include a controller 150 and a memory device 155. In an example, the controller 150 is communicatively coupled to the memory device 155. In an example, the memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In some examples, the data storage device 110 may be attached to or embedded within the host device 105. In another example, the data storage device 110 may be implemented as an external device or a portable device that can be communicatively or selectively coupled to the host device 105. In yet another example, the data storage device 110 may be a component (e.g., a solid-state drive (SSD)) of a network accessible data storage system, a network-attached storage system, a cloud data storage system, and the like.

As indicated above, the memory device 155 of the data storage device 110 may include a first memory die 165 and a second memory die 170. Although two memory dies are shown, the memory device 155 may include any number of memory dies (e.g., one memory die, two memory dies, eight memory dies, or another number of memory dies).

The memory device 155 may also include support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

Figure 2A:
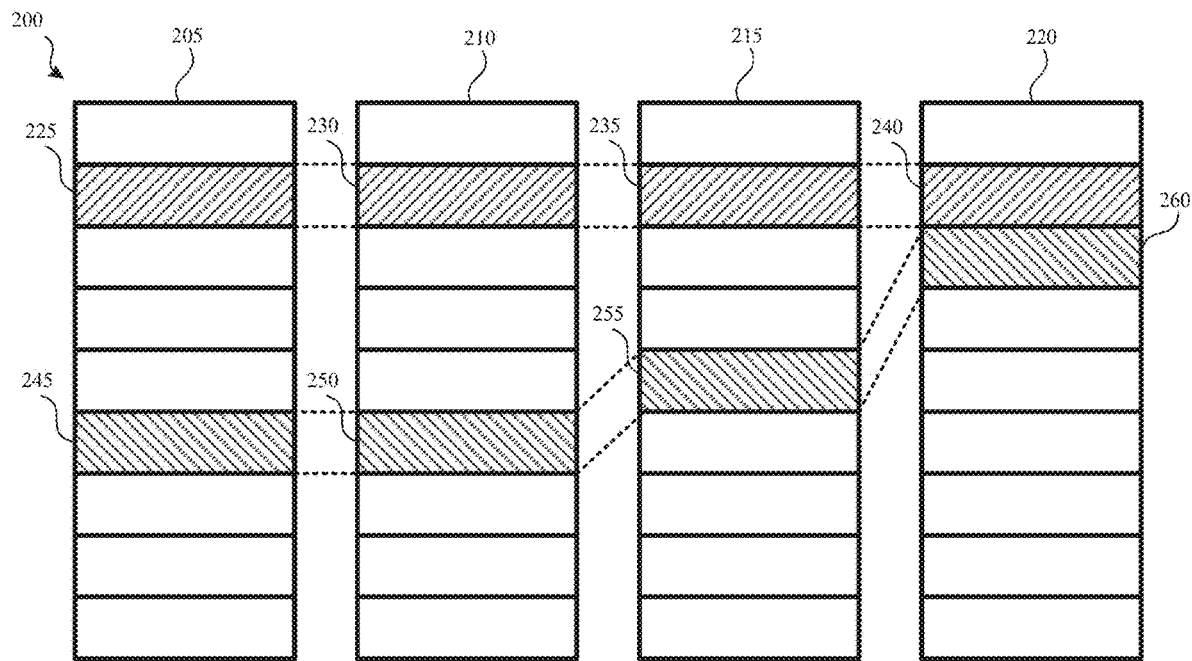
FIG. 2A illustrates how a memory die may include a number of memory blocks according to an example.

For example and referring to FIG. 2A, a memory device 200 (e.g., a storage element, a memory die, a non-volatile memory device) may include four planes or sub-arrays (e.g., a first plane 205, a second plane 210, a third plane 215, and a fourth plane 220). In an example, the planes may be integrated on a single memory die, be provided on two different memory dies (e.g., two planes on each memory die) or on four separate memory dies. Although four planes are shown and described, the memory device 200 may have any number of planes and/or memory dies.

In an example, the planes are divided into memory blocks consisting memory cells. As shown in FIG. 2A, the rectangles represent each memory block, such as memory block 225, memory block 230, memory block 235 and memory block 240. There may be dozens or hundreds of memory blocks in each plane of the memory device 200. In an example, each memory block is a unit of erase and is sometimes referred to as an erase block. For example, memory block 225, memory block 230, memory block 235 and memory block 240 include a minimum number of memory cells that are erased together.

In addition, various memory blocks may be logically linked or grouped together (e.g., using a table in or otherwise accessible by the controller 150) to form a metablock. A metablock may be written to, read from and/or erased as a single unit. For example, memory block 225, memory block 230, memory block 235 and memory block 240 may form a first metablock while memory block 245, memory block 250, memory block 255 and memory block 260 may form a second metablock. The memory blocks used to form a metablock need not be restricted to the same relative locations within their respective planes.

Figure 2B:
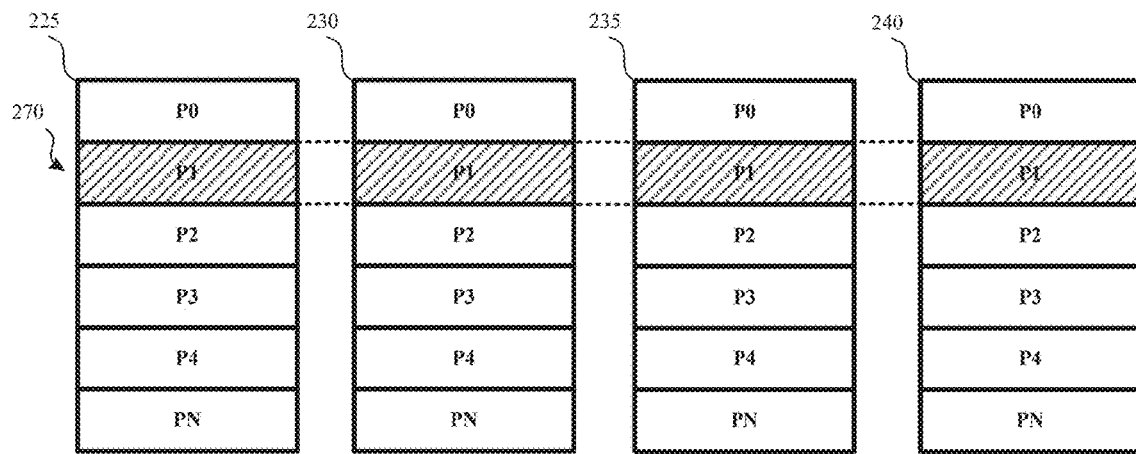
FIG. 2B illustrates how a memory block may include one or more pages according to an example.

In an example, each memory block may be divided, for operational purposes, into pages of memory cells, such as illustrated in FIG. 2B. For example, the memory cells of memory block 225, memory block 230, memory block 235 and memory block 240 are divided into N different pages (shown as P0-PN). Although a specific number of pages are shown in FIG. 2B, a memory block may have any number of pages of memory cells within each memory block.

In an example, a page is a unit of data programming within the memory block. Each page includes the minimum amount of data that can be programmed at one time. The minimum unit of data that can be read at one time may be less than a page. A metapage 270 is illustrated in FIG. 2B as being formed of one physical page from memory block 225, memory block 230, memory block 235 and memory block 240. In the example, shown, the metapage 270 includes page P1 in each of the four memory blocks. However, the pages of the metapage 270 need not have the same relative position within each of the memory blocks. A metapage 270 may be the maximum unit of programming within a memory block.

The memory blocks disclosed in FIG. 2A-FIG. 2B are referred to herein as physical memory blocks because they relate to groups of physical memory cells as discussed above. As used herein, a logical memory block is a virtual unit of address space defined to have the same size as a physical memory block. Each logical memory block includes a range of logical memory block addresses (LBAs) that are associated with data received from a host. The LBAs are then mapped to one or more physical memory blocks in the data storage device 110 where the data is physically stored.

Figure 2C:
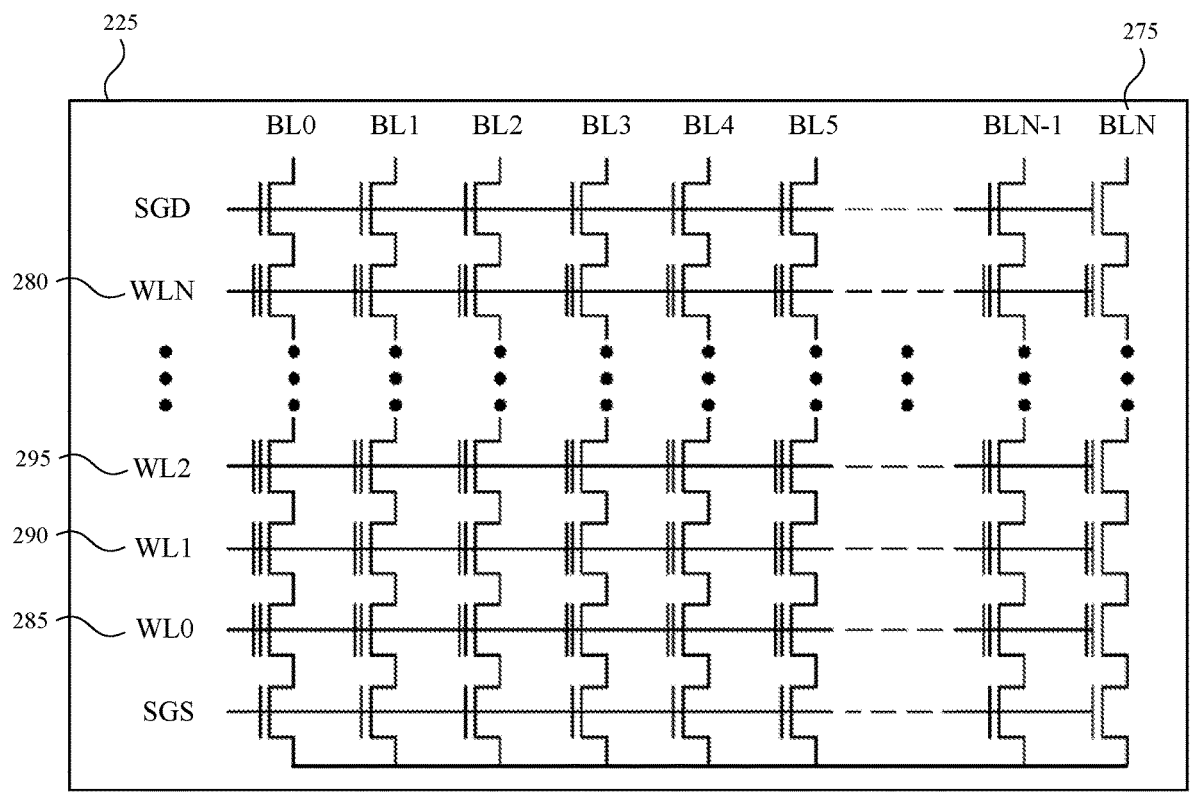
FIG. 2C illustrates how a memory block may include a number of memory cells according to an example.

As indicated above, each memory block may include any number of memory cells. The design, size, and organization of a memory block may depend on the architecture, design, and application desired for each memory die. In an example, the memory block may be or include a contiguous set of memory cells that share a plurality of word lines and bit lines. For example and as shown in FIG. 2C, the memory block 225 includes bit lines BL0-BLN (collectively bit lines 275), where N is a total number of bit lines. Additionally, the memory block 225 includes word lines WL0-WLN (collectively word lines 280), where N is a total number of word lines.

A word line 280 may function as a single-level-cell (SLC) word line, a multi-level-cell (MLC) word line, a tri-level-cell (TLC) word line, a quad-level cell (QLC) word line, a penta-level cell (PLC) word line and so on. Additionally, each memory cell may be programmable to a state (e.g., a threshold voltage in a flash configuration or a resistive state in a resistive memory configuration) that indicates one or more values.

In the example shown in FIG. 2C, four memory cells are connected in series to form a NAND string. Although four memory cells are depicted, any number of memory cells (e.g., 16, 32, 64, 128, 256 or any other number or memory cells) may be used. One terminal of the NAND string is connected to a corresponding bit line via a drain select gate (connected to select gate drain line SGD) and another terminal of the NAND string is connected to a source line via a source select gate (connected to select gate source line SGS). Additionally, although eight bit lines are shown in FIG. 2C, any number of bit lines may be used.

In an example, a word line 280 may include one or more portions, segments or sections. For example, a word line 280 may include a first section and a second section. Additionally, each section of the word line 280 may store data. The stored data may be a codeword that includes a data portion and a parity portion.

In some examples, one or more word lines 280 of the memory block 225 may be identified as a weak word line. A weak word line may be a word line 280 that has weaker or degraded electrical characteristics when compared to other word lines of the memory device 200. For example, one word line of the memory block 225 may have different a voltage threshold and/or failed bit count (FBC) characteristics when compared with other word lines of the memory block 225. The weaker or degraded characteristics of the word line may be caused by process/fabrication variations, wear and tear and/or NAND design architecture.

A weak word line may not be able to have enough capability to reach fine threshold voltage control with default programming. As a result, read and/or write performance of the memory block 225 and/or the memory device 200 may be negatively impacted. This may especially be true during high stress conditions such as when data is stored by the memory device 200 for a long period of time. For example, a weak word line may cause excessive read recoveries to be initiated. In another example, weak word lines may render stored data unrecoverable.

Word lines 280 of particular memory blocks (e.g., memory block 225) may be identified as weak word lines as part of a pre-characterization process performed on or by the memory device 200. In an example, the pre-characterization process helps identify defects and/or variations that may be present in the memory device 200. The pre-characterization process may include a series of tests that are performed on the memory device 200 to measure performance parameters of the memory device 200. These performance parameters may include a read speed and write speed of the memory device 200, power consumption parameters of the memory device 200 and/or the endurance of the memory device 200. In an example, the pre-characterization process may include a read disturb testing process executed on/by the memory device 200.

In the example shown in FIG. 2C, word line 0 (WL0) 285, word line 1 (WL1) 290 and word line 2 (WL2) 295 have been identified as weak word lines based, at least in part, on a pre-characterization process. Although each of these weak word lines are shown in sequence, any word line 280 of the memory block 225 may be identified as a weak word line. Additionally, although three weak word lines are shown and described, a memory block 225 and/or a memory device 200 may have any number of weak word lines.

Once a word line 280 has been identified as a weak word line, information associated with each weak word line may be stored as metadata (e.g., metadata 175 (FIG. 1)) or otherwise stored/identified by a slow word line system (e.g., slow word line system 180 (FIG. 1)) associated with the controller (e.g., controller 150 (FIG. 1)).

Although the pre-characterization process may identify weak word lines of particular memory blocks, due to variations across different memory dies (e.g., the first memory die 165 and the second memory die 170 (FIG. 1)), the identified weak word lines may be weaker across different memory blocks on a memory die and/or the identified weak word lines may be weaker across one memory die when compared to another memory die. Additionally, the pre-characterization process may not identify how each memory die responds to or otherwise handles operations on the weak word lines. Further, it may not be apparent until after many program-erase cycles that some dies may have weaker weak word lines when compared with other dies that have weak word lines.

In order to address the above, the controller (or other processing system) associated with the memory device 200 may periodically perform a slow programming audit on one or more memory blocks of one or more memory dies to determine whether the identified/known weak word lines are causing issues. If it is determined that the weak word lines are causing (or could potentially cause) data read, data write and/or data retention issues, the memory dies may be marked or otherwise identified as a candidate for slow programming.

In an example, when a memory die is marked as a candidate for slow programming, subsequent programming operations performed on the weak word lines of the candidate memory die are performed at a lower rate when compared to other programming operations performed on other word lines of the memory die. In an example, slow programming is performed on all memory blocks associated with the weak word lines of the candidate memory die.

In an example, the slow programming audit includes a process of determining whether a failed bit count of the weak word lines and/or associated memory blocks are above a failed bit count threshold. Although a failed bit count threshold is specifically mentioned, other performance metrics may be used. For example, a performance metric may include a determination that a percentage of an error correction capability of an error correction system is being met or exceeded. In another example, the performance metric may include a number of bit flips that occur during a read operation and/or a write operation. In yet another example, a syndrome weight of a codeword may be used as the performance metric as the syndrome weight may be correlated with the failed bit count and may be obtained more quickly than the failed bit count without fully decoding the codeword. Although specific examples are given, other performance metrics may be used. If it is determined that the weak word lines are causing issues, subsequent programming operations, on some, or all of the identified weak word lines, across some or all of the memory blocks of the candidate memory die that are associated with, or are otherwise communicatively coupled to, the identified weak word lines, will be implemented at a slower rate or speed.

For example, during a programming operation associated with an identified weak word line, a finer control of program voltage may be applied to the weak word line (e.g., the controller may decrease a voltage step value in incremental step pulse programming). In an example, this may lead to narrower states in a threshold voltage distribution of the weak word lines and, as a result, lead to a lower failed bit counts (or improved metrics). In another example, the system m ay implement more precise timing control when programming weak word lines.

However, slow programming on one or more weak word lines of a memory die may increase latency. As such, it may be beneficial to implement slow programming sparingly and/or implement slow programming on an as needed basis. Additionally, slow programming may not be needed during an early life stage of a memory device (e.g., a memory device having low program/erase (P/E) cycles). As such, a controller, a processor, firmware/software or other system integrated or otherwise associated with the memory device 200 may determine whether and/or when to implement slow programming.

Referring back to FIG. 1, when weak word lines are identified, the memory device 155 may store metadata 175 associated with one or more of the identified weak word lines. This may include information about where the weak word lines are located, including whether the weak word lines are associated with the first memory die 165, the second memory die 170, a memory block or memory blocks associated with the first memory die 165 and/or the second memory die 170 and so on.

The metadata 175 may also indicate a number of program/erase cycles of the memory device 155, a failed bit count (FBC) associated with the memory device 155, a syndrome weight, a bit error rate (BER), a status indicator of a particular word line or word lines (e.g., whether a particular word line is identified as a weak word line) and/or whether particular word lines across all memory blocks of a particular memory die (e.g., the first memory die 165 and/or the second memory die 170) should implement slow programming such as described in greater detail herein.

As previously described, the data storage device 110 may also include a controller 150. The controller 150 may be communicatively coupled to the memory device 155 via a bus, an interface or other communication circuitry. In an example, the communication circuitry may include one or more channels to enable the controller 150 to communicate with the first memory die 165 and/or the second memory die 170 of the memory device 155. In another example, the communication circuitry may include multiple distinct channels which enables the controller 150 to communicate with the first memory die 165 independently and/or in parallel with the second memory die 170 of the memory device 155.

The controller 150 may receive data and/or instructions from the host device 105. The controller 150 may also send data to the host device 105. For example, the controller 150 may send data to and/or receive data from the host device 105 via the communication interface 140. The controller 150 may also send data and/or commands to and/or receive data from the memory device 155.

The controller 150 may send data and a corresponding write command to the memory device 155 to cause the memory device 155 to store data at a specified address of the memory device 155. In an example, the write command specifies a physical address of a portion of the memory device 155. In an example, the controller 150 may also provide or otherwise cause data that is to be written at the specified portion of the memory device 155 to be written at a particular speed based, at least in part, on an identification of weak word lines associated with the first memory die 165 and/or the second memory die 170.

The controller 150 may also send data and/or commands associated with one or more background scanning operations, garbage collection operations, and/or wear leveling operations. The controller 150 may also send one or more read commands to the memory device 155. In an example, the read command specifies the physical address of a portion of the memory device 155 at which the data is stored. The controller 150 may also track the number of program/erase cycles or other programming operations that have been performed on or by the memory device and/or the memory dies of the memory device 155.

The controller 150 may also include or otherwise be associated with a slow word line system 180. The slow word line system 180 may be a packaged functional hardware unit designed for use with other components/systems, a portion of a program code (e.g., software or firmware) executable by a processor or processing circuitry, or a self-contained hardware and/or software component that interfaces with other components and/or systems.

In an example, the slow word line system 180 may include information or otherwise be provided instructions regarding which word lines of which memory dies have been identified as weak word lines. The slow word line system 180 may also determine or otherwise provide instructions as to when slow programming should be implemented on a particular memory die. Accordingly, the slow word line system 180 may perform a slow programming audit in order to determine whether, when and how slow programming across word lines of a particular memory die should be implemented.

The slow programming audit may be performed by the slow word line system 180 based on one or more criterion. For example, the slow programming audit may be performed by the slow word line system 180 after a threshold number of program/erase cycles have been performed on/by the first memory die 165 and/or the second memory die 170 of the memory device 155. In another example, the slow programming audit may be triggered after a threshold number of program/erase cycles have been performed on an individual memory block of the first memory die 165 and/or the second memory die 170.

For example and as previously described, slow programming on weak word lines may not need to be implemented at an early life stage (e.g., under a threshold number of program/erase cycles) of the memory device 155. Therefore, the slow programming audit may be performed by the slow word line system 180 after a threshold number of programming operations (e.g., fifty program/erase cycles) have occurred. Although a specific number of program/erase cycles are mentioned, these are for example purposes only and the slow programming audit may be performed based on other metrics being met/exceeded.

For example, a slow programming audit may be performed when an error correction (ECC) system 185 determines that a certain number of bits have been flipped during a read operation on the identified weak word lines. In another example, the slow programming audit may be performed in response to a percentage of an error correction capability of the error correction system 185 being met or exceeded. Although specific examples are given, other metrics (e.g., metrics associated with read/write errors) may be used to determine whether the slow word line system 180 should initiate a slow programming audit. In an example and regardless of the metric/criteria used, the threshold and/or the associated metric/criteria may be stored by the slow word line system 180. In another example, the threshold and/or the associated metric/criteria may be stored as metadata 175.

If the slow word line system 180 determines that a slow programming audit should proceed (e.g., based on fifty program erase cycles being performed on a memory block and/or a memory die), the slow word line system 180 selects one or more of the identified slow word lines (e.g., WL0 285, WL1 290 and/or WL2 295 (FIG. 2C)) of a particular memory die. In this example, all three of the identified slow word lines are selected by the slow word line system 180. However, it is contemplated that a subset of the identified slow word lines may be selected.

Once one or more of the identified slow word lines have been identified and/or selected, the slow word line system 180 may also select one or more memory blocks (e.g., memory block 225, memory block 230, memory block 235 and/or memory block 240 (FIG. 2A)) that are associated with the identified weak word lines. In an example, the memory blocks may be on the same plane of the memory die or on different planes of the memory die.

Once the memory blocks have been identified, the slow word line system 180 determines a failed bit count (or other performance metric) of each weak word line and/or each identified memory block. For example, the slow word line system 180 may determine the failed bit count of WL0 285, WL1 290 and WL2 295 on memory block 225, memory block 230, memory block 235 and/or memory block 240. In an example, the failed bit count may be measured using a test pattern, a read operation or other process.

Once the failed bit count of the identified weak word lines across the identified memory blocks is determined, the slow word line system 180 may determine the average failed bit count of the weak word lines and the identified memory blocks. If the average failed bit count is over a failed bit count threshold (or other performance metric threshold), the slow word line system 180 marks the memory die on which the weak word lines are located as a candidate for slow programming. In an example, when a memory die is marked as a candidate for slow programming or is otherwise identified, slow programming is used for subsequent operations on the weak word lines across all memory blocks of the memory die that are associated with the weak word lines-regardless of whether the memory blocks were used to determine the failed bit count described above.

In another example, weak word lines that are selected for an audit may be a subset of the total weak word line set. In this example, if the average failed bit count of the audited weak word lines exceed a failed bit count threshold, all weak word lines of all blocks in the memory die may be marked for slow programming. This may include word lines that were not audited. For example, WL0 285, WL1 290, and WL2 295 may be weak word lines but only WL0 285 and WL1 290 in one or more blocks of the memory die may be audited. However, if the average failed bit count of the audited word lines exceed the failed bit count threshold, WL0 285, WL1 290, and WL2 295 in all memory blocks in the memory die will be marked for slow programming.

Continuing with the example above, the slow word line system 180 may determine that the average failed bit count of WL0 285, WL1 290 and WL2 295 on memory block 225, memory block 230, memory block 235 and/or memory block 240 is two hundred fifty. Additionally, the failed bit count threshold may be two hundred.

Because the average failed bit count across WL0 285, WL1 290 and WL2 295 on memory block 225, memory block 230, memory block 235 and/or memory block 240 exceeds the failed bit count threshold, the slow word line system 180 marks the memory die containing these weak word lines, and associated memory blocks, as a candidate for slow programming. As such, slow programming will be performed on word lines WL0 285, WL1 290 and WL2 295 across all memory blocks (not just memory block 225, memory block 230, memory block 235 and/or memory block 240) associated with these word lines on the memory die.

However, if the slow word line system 180 determines that the average failed bit count does not exceed the failed bit count threshold, the memory device 155 and/or its associated memory dies are monitored to determine when another slow programming audit should be performed. In an example, the subsequent slow programming audit is performed by the slow word line system 180 after another threshold program/erase cycles (e.g., another fifty program/erase cycles) have been completed.

In some examples, the controller 150 and/or the slow word line system 180 may perform additional slow programming audits more frequently as more program/erase cycles are completed. For example, a first slow programming audit may be performed after a first programming operation threshold has been met/exceeded (e.g., fifty program/erase cycles) and a second slow programming audit may be performed (presuming the failed bit count threshold determined during the first slow programming audit did not exceed the failed bit count threshold) after a second programming operation threshold has been met/exceeded (e.g., forth program/erase cycles).

Once the threshold number of program/erase cycles has been completed, the slow word line system 180 will repeat the various operations described above. For example, the slow word line system 180 selects one or more of the identified slow word lines of the particular memory die and also selects one or more memory blocks that are associated with the identified weak word lines. Once the memory blocks have been identified, the slow word line system 180 determines a failed bit count (or other metric) of each weak word line and/or each identified memory block.

In an example, the same memory blocks that were selected during the first slow programming audit may be selected for the second slow programming audit. For example, memory block 225, memory block 230, memory block 235 and memory block 240 were selected during the first slow programming audit. Accordingly, these same memory blocks may be selected for the second slow programming audit.

In another example, different memory blocks may be selected for the slow programming audit, so long as the different memory blocks are associated with the identified weak word lines. For example, the slow word line system 180 may select or otherwise use memory block 245 (FIG. 2A), memory block 250 (FIG. 2A), memory block 255 (FIG. 2A) and memory block 260 (FIG. 2A) for the second slow programming audit.

In yet another example, a subset of memory blocks that were selected for one slow programming audit may be selected again for a subsequent slow programming audit. Memory blocks that are selected for multiple slow programming audits may be selected based on one or more performance metrics associated with each memory block and/or associated weak word line.

For example, a determined failed bit count of a particular memory block and weak word line combination may be lower or higher than determined failed bit counts of other memory blocks and/or associated weak word lines that were selected during the first slow programming audit. Although a specific example is given, memory blocks may be selected for one or more slow programming audits based on other performance metrics or criteria.

In another example, a frequency of slow programming audits may be dynamically adjusted. For example, the frequency of the slow programming audits could be based, at least in part, on the results of one or more previously performed slow programming audits. In this example, a second failed bit count threshold could be selected to be lower than a first or primary failed bit count threshold. If the average failed bit count exceeds the second threshold but is lower than the first threshold, the slow programming audit frequency may increase.

As previously discussed, if the average failed bit count of the selected weak word lines and/or selected memory blocks exceed a failed bit count threshold, the slow word line system 180 marks the memory die containing these weak word lines and associated memory blocks as a candidate for slow programming such as previously described.

As briefly mentioned above, the controller 150 may also include or otherwise be associated with an error correction code (ECC) system 185. In an example, the ECC system 185 may work with and/or provide information to the slow word line system 180.

The ECC system 185 may receive data and generate one or more ECC code words based, at least in part, on the received data. For example, the ECC system 185 may include an encoder that encodes the received data using one or more encoding techniques. The ECC system 185 may also include a decoder to decode data read from the memory device 155. The ECC system 185 may also detect and correct bit errors that may be present in the stored/read data. For example, the ECC system 185 may correct a number of bit errors up to an error correction capability of a particular ECC technique used by the ECC system 185.

In an example, the ECC system 185 may determine or otherwise track a failed bit count, a syndrome weight, a bit error rate and/or other metrics associated with data decoded by the ECC system 185. For example, the ECC system 185 may determine the failed bit count using a test pattern, a read operation or other process. In another example, the ECC system 185 may track or otherwise determine a syndrome weight of read data rather than decoding the read data and counting the failed bit count and/or the number of errors in read data. In yet another example, the number of errors may be based on known test data, a known sequence or a known test pattern generated by or otherwise accessible to the controller 150. For example, the controller 150 may generate a known sequence and compare read data with the known sequence to count a number of failed bits without having to perform an encoding or decoding operation.

The slow word line system 180 may receive the failed bit count or other performance metric from the ECC system 185. Once received, the slow word line system 180 may compare the failed bit count or other metric to a failed bit count threshold such as previously described. If the failed bit count reaches or exceeds the failed bit count threshold, the slow programming audit is initiated such as previously described.

Figure 3:
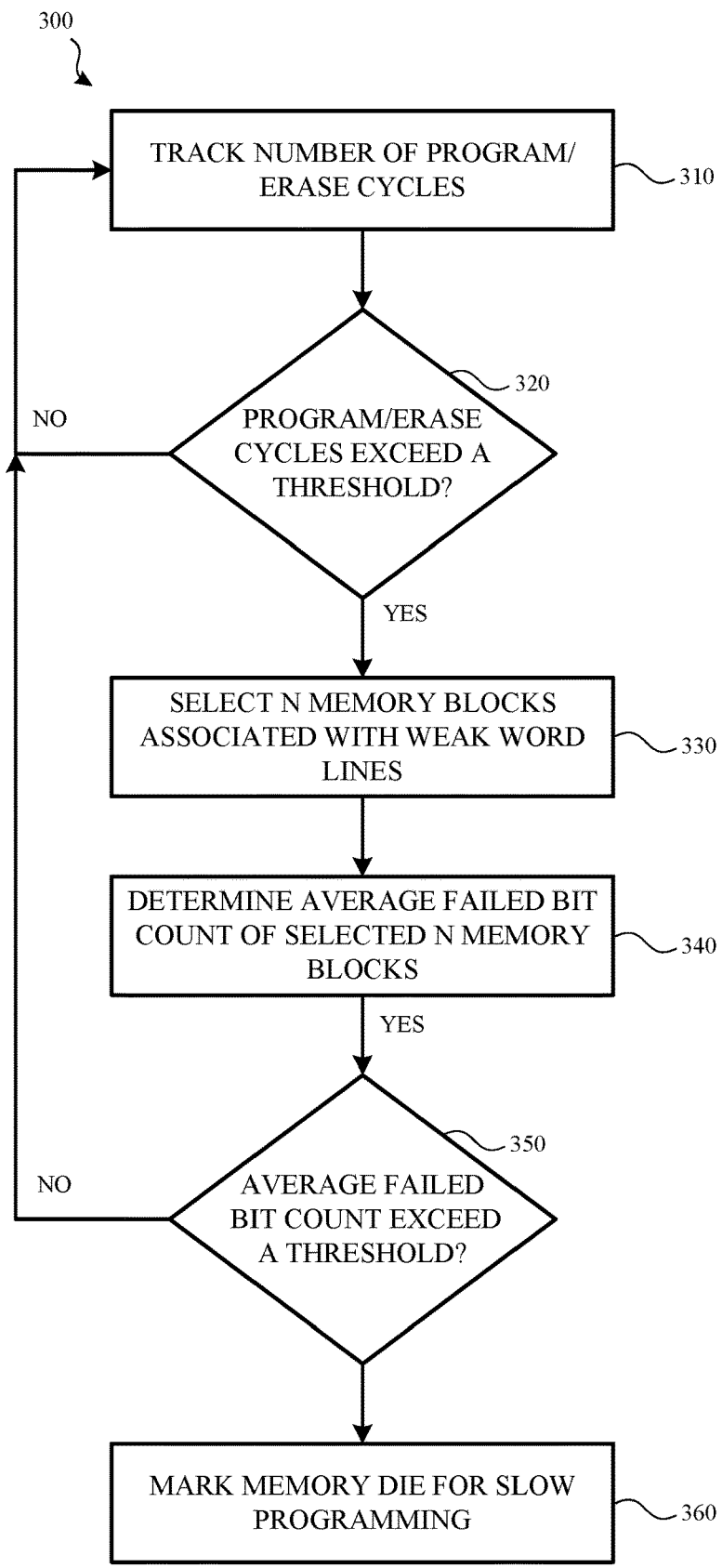
FIG. 3 illustrates a method for performing a slow programming audit on one or more weak word lines of a memory die according to an example.

FIG. 3 illustrates a method 300 for performing a slow programming audit on one or more weak word lines of a memory die according to an example. The method 300 may be performed on a memory device and/or one or more storage elements of a data storage device, such as, for example, the data storage device 110 shown and described with respect to FIG. 1. Additionally, the various operations shown and described with respect to FIG. 3 may be performed by a controller and/or a slow word line system, such as, for example, the controller 150 and the slow word line system 180 shown and described with respect to FIG. 1.

Method 300 begins by tracking (310) a number of program/erase cycles for a particular memory die or memory device. As previously discussed, although a program/erase cycles are specifically mentioned, other programming operation metrics may be used to determine whether a slow programming audit is to be initiated. Additionally, prior to or during the method 300, one or more weak word lines of the particular memory die and/or memory device may have already been identified.

A determination (320) may then be made as to whether a number of program/erase cycles exceeds a threshold number of program/erase cycles. As previously discussed, slow word lines may not negatively impact a memory die or a memory device at the beginning of life of the memory device. Therefore, a slow programming audit may not need to be performed until after a threshold number of program/erase cycles has been performed.

If it is determined (320) that the number of program/erase cycles does not exceed a threshold, the controller continues to monitor and/or track (310) the number of program/erase cycles performed on/by the memory die or memory device. However, if it is determined (320) that the number of program/erase cycles exceeds the programming operation threshold, a slow programming audit is initiated.

In an example, the slow programming audit includes selecting (330) N memory blocks associated with the identified weak word lines. In an example, any number of memory blocks may be selected so long as they are associated with the identified weak word lines.

Once the N memory blocks have been selected, a testing process (or other process) is initiated to determine the failed bit count of each memory block/weak word line combination. In an example, the testing process may include using a test pattern, a read operation or other process to determine a number of failed bits caused by the weak word lines. The controller may then determine (340) an average failed bit count of the memory block/weak word line combinations.

When the average failed bit count is determined, the controller determines (350) whether the average failed bit count exceeds a failed bit count threshold. If it is determined (350) that the average failed bit count does not exceed the failed bit count threshold, the controller may continue to monitor or track (310) the number of program/erase cycles to determine when to initiate a subsequent slow programming audit.

However, if it is determined (350) that the average failed bit count exceeds the failed bit count threshold, the memory die may be marked (360) for slow programming. As such, the identified weak word lines, and the memory blocks associated with the identified weak word lines, across the memory die will be programmed at a slower speed when compared to programming speeds on word lines that are not identified as weak word lines.

Figure 4:
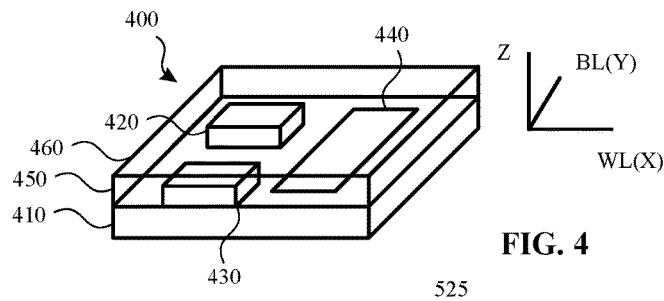
FIG. 4 is a perspective view of a storage device that includes three-dimensional (3D) stacked non-volatile memory according to an example.
Figure 5:
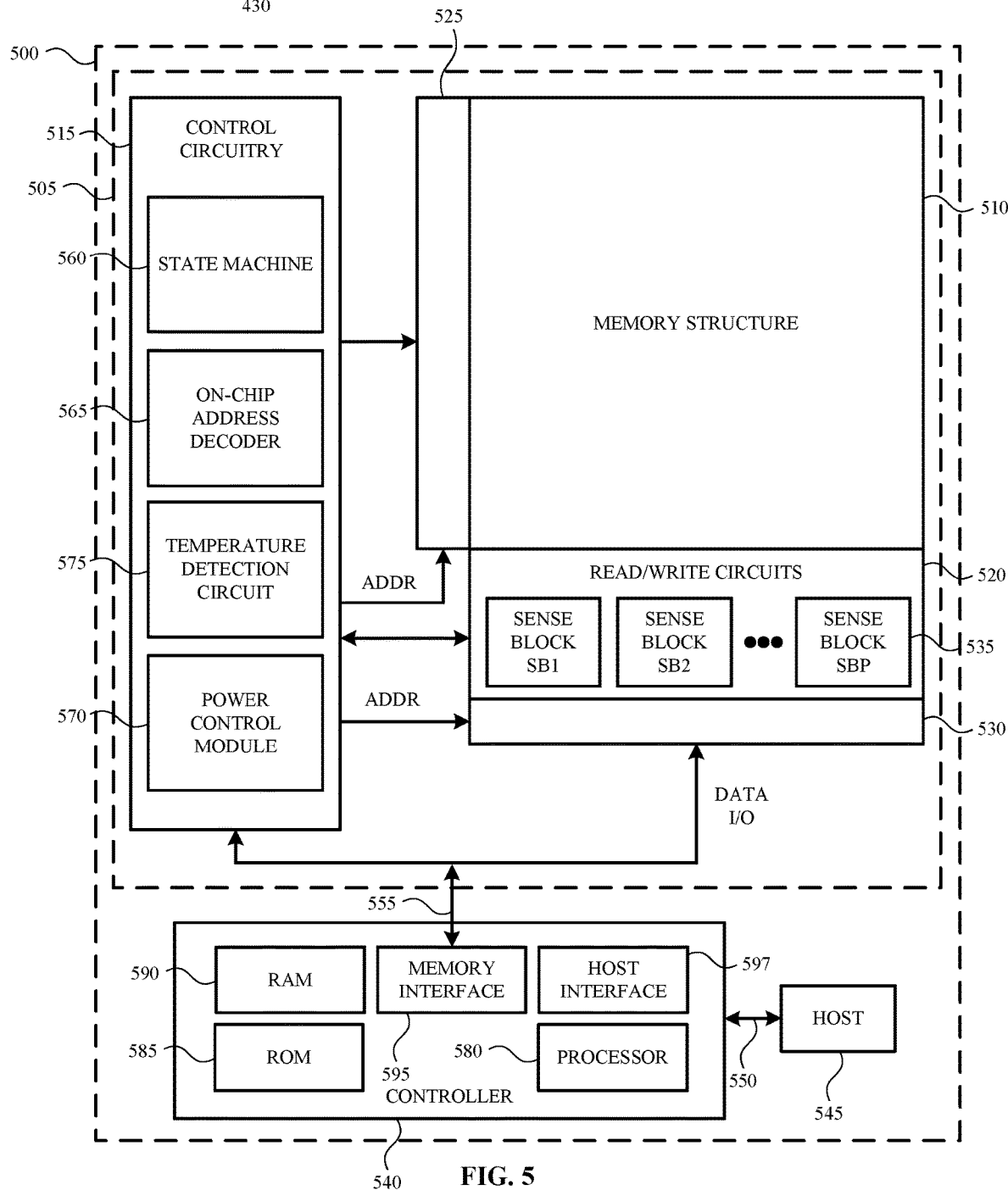
FIG. 5 is a block diagram of a storage device according to an example.

FIG. 4-FIG. 5 describe example storage devices that may be used with or otherwise implement the various features described herein. For example, the storage devices shown and described with respect to FIG. 4-FIG. 5 may include various systems and components that are similar to the systems and components shown and described with respect to FIG. 1. For example, the controller 540 shown and described with respect to FIG. 5 may be similar to the controller 150 of FIG. 1. Likewise, the memory dies 505 may be similar to the first memory die 165 and/or the second memory die 170 of FIG. 1.

FIG. 4 is a perspective view of a storage device 400 that includes three-dimensional (3D) stacked non-volatile memory according to an example. In this example, the storage device 400 includes a substrate 410. Blocks of memory cells are included on or above the substrate 410.

The blocks may include a first block (BLK0 420) and a second block (BLK1 430). Each block may be formed of memory cells (e.g., non-volatile memory elements). The substrate 410 may also include a peripheral area 440 having support circuits that are used by the first block and the second block.

The substrate 410 may also carry circuits under the blocks, along with one or more lower metal layers which are patterned in conductive paths to carry signals from the circuits. The blocks may be formed in an intermediate region 450 of the storage device 400. The storage device may also include an upper region 460. The upper region 460 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 410 in the x-direction represents a direction in which signal paths for word lines or control gate lines extend (e.g., a word line or drain-end select gate (SGD) line direction) and the width of the plane of the substrate 410 in the y-direction represents a direction in which signal paths for bit lines extend (e.g., a bit line direction). The z-direction represents a height of the storage device 400.

FIG. 5 is a functional block diagram of a storage device 500 according to an example. In an example, the storage device 500 may be the 3D stacked non-volatile storage device 400 shown and described with respect to FIG. 4. The components depicted in FIG. 5 may be electrical circuits. In an example, the storage device 500 includes one or more memory dies 505. Each memory die 505 includes a three-dimensional memory structure 510 of memory cells (e.g., a 3D array of memory cells), control circuitry 515, and read/write circuits 520. In another example, a two-dimensional array of memory cells may be used. The memory structure 510 is addressable by word lines using a first decoder 525 (e.g., a row decoder) and by bit lines using a second decoder 530 (e.g., a column decoder). The read/write circuits 520 may also include multiple sense blocks 535 including SB1, SB2 . . . . SBp (e.g., sensing circuitry) which allow pages of the memory cells to be read or programmed in parallel. The sense blocks 535 may include bit line drivers.

In an example, a controller 540 is included in the same storage device 500 as the one or more memory dies 505. In another example, the controller 540 is formed on a die that is bonded to a memory die 505, in which case each memory die 505 may have its own controller 540. In yet another example, a controller die controls all of the memory dies 505.

Commands and data may be transferred between a host 545 and the controller 540 using a data bus 550. Commands and data may also be transferred between the controller 540 and one or more of the memory dies 505 by way of lines 555. In one example, the memory die 505 includes a set of input and/or output (I/O) pins that connect to lines 555.

The memory structure 510 may also include one or more arrays of memory cells. The memory cells may be arranged in a three-dimensional array or a two-dimensional array. The memory structure 510 may include any type of non-volatile memory that is formed on one or more physical levels of arrays of memory cells having an active area disposed above a silicon substrate. The memory structure 510 may be in a non-volatile memory device having circuitry associated with the operation of the memory cells, whether the associated circuitry is above or within the substrate.

The control circuitry 515 works in conjunction with the read/write circuits 520 to perform memory operations (e.g., erase, program, read, and others) on the memory structure 510. The control circuitry 515 may include registers, ROM fuses, and other devices for storing default values such as base voltages and other parameters.

The control circuitry 515 may also include a state machine 560, an on-chip address decoder 565, a power control module 570 and a temperature detection circuit 575. The state machine 560 may provide chip-level control of various memory operations. The state machine 560 may be programmable by software. In another example, the state machine 560 does not use software and is completely implemented in hardware (e.g., electrical circuits).

The on-chip address decoder 565 may provide an address interface between addresses used by host 545 and/or the controller 540 to a hardware address used by the first decoder 525 and the second decoder 530.

The power control module 570 may control power and voltages that are supplied to the word lines and bit lines during memory operations. The power control module 570 may include drivers for word line layers in a 3D configuration, select transistors (e.g., SGS and SGD transistors) and source lines. The power control module 570 may include one or more charge pumps for creating voltages.

The control circuitry 515 may also include a temperature detection circuit 575. The temperature detection circuit may be configured to detect a temperature of one or more components of the memory device 500.

The control circuitry 515, the state machine 560, the on-chip address decoder 565, the first decoder 525, the second decoder 530, the temperature detection circuit 575, the power control module 570, the sense blocks 535, the read/write circuits 520, and/or the controller 540 may be considered one or more control circuits and/or a managing circuit that perform some or all of the operations described herein.

In an example, the controller 540, is an electrical circuit that may be on-chip or off-chip. Additionally, the controller 540 may include one or more processors 580, ROM 585, RAM 590, memory interface 595, and host interface 597, all of which may be interconnected. In an example, the one or more processors 580 is one example of a control circuit. Other examples can use state machines or other custom circuits designed to perform one or more functions. Devices such as ROM 585 and RAM 590 may include code such as a set of instructions. One or more of the processors 580 may be operable to execute the set of instructions to provide some or all of the functionality described herein.

Alternatively or additionally, one or more of the processors 580 may access code from a memory device in the memory structure 510, such as a reserved area of memory cells connected to one or more word lines. The memory interface 595, in communication with ROM 585, RAM 590, and one or more of the processors 580, may be an electrical circuit that provides an electrical interface between the controller 540 and the memory die 505. For example, the memory interface 595 may change the format or timing of signals, provide a buffer, isolate from surges, latch I/O, and so forth.

The one or more processors 580 may issue commands to control circuitry 515, or any other component of memory die 505, using the memory interface 595. The host interface 597, in communication with the ROM 585, the RAM 595, and the one or more processors 580, may be an electrical circuit that provides an electrical interface between the controller 540 and the host 545. For example, the host interface 597 may change the format or timing of signals, provide a buffer, isolate from surges, latch I/O, and so on. Commands and data from the host 545 are received by the controller 540 by way of the host interface 597. Data sent to the host 545 may be transmitted using the data bus 550.

Multiple memory elements in the memory structure 510 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Based on the above, examples of the present disclosure describe a method, comprising: identifying one or more weak word lines of a memory die; selecting one or more memory blocks associated with each of the one or more weak word lines; determining a performance metric of each of the one or more weak word lines and the associated one or more memory blocks; determining whether the performance metric of each of the one or more weak word lines and the associated one or more memory blocks exceeds a performance metric threshold; and based on determining the performance metric of each of the one or more weak word lines and the associated one or more memory blocks exceeds the performance metric threshold, identifying the memory die as a candidate for slow programming operations. In an example, the performance metric is determined after a predetermined number of programming operations have been performed on the memory die. In an example, the programming operations are program/erase operations. In an example, the performance metric is a failed bit count associated with the one or more weak word lines and the associated one or more memory blocks. In an example, the method also includes monitoring a number of programming operations performed on the memory die based, at least in part, on determining that the performance metric of each of the one or more weak word lines and the associated one or more memory blocks is below the performance metric threshold. In an example, the method also includes determining an additional performance metric of each of the one or more weak word lines and one or more additional memory blocks associated with the one or more weak word lines after a predetermined number of programming operations have been performed on the memory die; determining whether the additional performance metric of each of the one or more weak word lines and the one or more additional memory blocks exceeds the performance metric threshold; and based on determining the additional performance metric of each of the one or more weak word lines and the one or more additional memory blocks exceeds the performance metric threshold, identifying the memory die as a candidate for slow programming operations. In an example, the one or more additional memory blocks include at least one of the selected memory blocks. In an example, identifying the memory die as a candidate for slow programming operations causes subsequent programming operations performed on the one or more weak word lines of the memory die, and the memory blocks associated with the one or more weak word lines, to be programmed at a rate that is lower than a programming rate of programming operations performed on other word lines of the memory die. In an example, determining the performance metric of each of the one or more weak word lines and the associated one or more memory blocks comprises determining an average of the performance metric of each of the one or more weak word lines and the associated one or more memory blocks.

Examples also describe a data storage device, comprising: one or more memory dies; and a controller communicatively coupled to the one or more memory dies and operable to: monitor programming operations performed on each memory die of the one or more memory dies; and based on a determination that a number of programming operations performed on at least one memory die of the one or more memory dies exceeds a programming operation threshold: identify at least one weak word line associated with the at least one memory die of the one or more memory dies; select one or more memory blocks associated with the at least one weak word line; determine a failed bit count of the at least one weak word line and the one or more memory blocks associated with the at least one weak word line; determine whether the failed bit count exceeds a failed bit count threshold; and based on a determination that the failed bit count exceeds the failed bit count threshold, identify the at least one memory die as a candidate for slow programming operations. In an example, the programming operations are program/erase operations. In an example, the controller is further operable to continue monitoring the programming operations performed on the at least one memory die of the one or more memory dies based, at least in part, on a determination that the failed bit count is below the failed bit count threshold. In an example, the controller is further operable to: determine an additional failed bit count of the at least one weak word line and one or more additional memory blocks associated with the at least one weak word line based, at least in part, on a determination that an additional number of programming operations performed on the at least one memory die of the one or more memory dies exceeds the programming operation threshold during the continued monitoring; determine whether the additional failed bit count exceeds the failed bit count threshold; and based on a determination that the additional failed bit count exceeds the failed bit count threshold, identify the at least one memory die as a candidate for slow programming operations. In an example, the one or more additional memory blocks include the selected one or more memory blocks. In an example, identifying the at least one memory die as a candidate for slow programming operations causes the controller to perform subsequent programming operations on the at least one weak word line of the at least one memory die, and the memory blocks associated with the at least one weak word line, to be programmed at a rate that is lower than a programming rate of programming operations performed on other word lines of the at least one memory die.

Examples also describe a non-volatile storage device, comprising: one or more memory dies; means for identifying one or more weak word lines associated with each of the one or more memory dies; means for selecting one or more memory blocks associated with each of the one or more weak word lines; means for determining a performance metric associated with each of the one or more weak word lines and the associated one or more memory blocks; and means for identifying at least one memory die of the one or more memory dies as a candidate for slow programming operations based, at least in part, on a determination that the performance metric associated with each of the one or more weak word lines of the at least one memory die exceeds a performance metric threshold. In an example, the non-volatile storage device includes means for monitoring a number of programming operations performed on each memory die of the one or more memory dies. In an example, determining the performance metric associated with each of the one or more weak word lines and the associated one or more memory blocks occurs based, at least in part, on the monitoring means determining that the number of programming operations performed on at least one memory die of the one or more memory dies exceed a threshold. In an example, identifying the at least one memory die of the one or more memory dies as a candidate for slow programming operations causes programming means of the non-volatile storage device to perform programming operations on the one or more weak word lines of the at least one memory die, and the memory blocks associated with the one or more weak word lines, at a rate that is lower than a programming rate of programming operations performed on other word lines of the at least one memory die. In an example, the non-volatile storage device includes means for monitoring programming operations performed on the at least one memory die of the one or more memory dies based, at least in part, on a determination that the failed bit count associated with each of the one or more weak word lines and the associated one or more memory blocks of the at least one memory die is below the performance metric threshold.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C. B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
    identifying one or more weak word lines of a memory die;
    selecting one or more memory blocks associated with each of the one or more weak word lines;
    determining a performance metric of each of the one or more weak word lines and the associated one or more memory blocks;
    determining whether the performance metric of each of the one or more weak word lines and the associated one or more memory blocks exceeds a performance metric threshold;
    based, at least in part, on determining the performance metric of each of the one or more weak word lines and the associated one or more memory blocks exceeds the performance metric threshold, identifying the one or more weak word lines of the memory die as a candidate for slow programming operations; and
    causing subsequent programming operations performed on the one or more weak word lines of the memory die, and the memory blocks associated with the one or more weak word lines, to be programmed at a rate that is lower than a programming rate of programming operations performed on other word lines of the memory die.

2. The method of claim 1, wherein the performance metric is determined after a predetermined number of programming operations have been performed on the memory die.

3. The method of claim 1, wherein the performance metric is a failed bit count associated with the one or more weak word lines and the associated one or more memory blocks.

4. The method of claim 1, further comprising monitoring a number of programming operations performed on the memory die based, at least in part, on determining that the performance metric of each of the one or more weak word lines and the associated one or more memory blocks is below the performance metric threshold.

5. The method of claim 4, further comprising:
    determining an additional performance metric of each of the one or more weak word lines and one or more additional memory blocks associated with the one or more weak word lines after a predetermined number of programming operations have been performed on the memory die;
    determining whether the additional performance metric of each of the one or more weak word lines and the one or more additional memory blocks exceeds the performance metric threshold; and
    based, at least in part, on determining the additional performance metric of each of the one or more weak word lines and the one or more additional memory blocks exceeds the performance metric threshold, identifying the memory die as a candidate for slow programming operations.

6. The method of claim 5, wherein the one or more additional memory blocks include at least one of the selected memory blocks.

7. The method of claim 1, wherein determining the performance metric of each of the one or more weak word lines and the associated one or more memory blocks comprises determining an average of the performance metric of each of the one or more weak word lines and the associated one or more memory blocks.

8. A data storage device, comprising:
    one or more memory dies; and
    a controller communicatively coupled to the one or more memory dies and operable to:
        monitor programming operations performed on each memory die of the one or more memory dies; and
        based, at least in part, on a determination that a number of programming operations performed on at least one memory die of the one or more memory dies exceeds a programming operation threshold:
            identify at least one weak word line associated with the at least one memory die of the one or more memory dies;
            select one or more memory blocks associated with the at least one weak word line;
            determine a failed bit count of the at least one weak word line and the one or more memory blocks associated with the at least one weak word line;
            determine whether the failed bit count exceeds a failed bit count threshold; and
            based, at least in part, on a determination that the failed bit count exceeds the failed bit count threshold, identify the at least one weak word line of the memory die as a candidate for slow programming operations.

9. The data storage device of claim 8, wherein the controller is further operable to continue monitoring the programming operations performed on the at least one memory die of the one or more memory dies based, at least in part, on a determination that the failed bit count is below the failed bit count threshold.

10. The data storage device of claim 9, wherein the controller is further operable to:
    determine an additional failed bit count of the at least one weak word line and one or more additional memory blocks associated with the at least one weak word line based, at least in part, on a determination that an additional number of programming operations performed on the at least one memory die of the one or more memory dies exceeds the programming operation threshold during the continued monitoring;

determine whether the additional failed bit count exceeds the failed bit count threshold; and based on a determination that the additional failed bit count exceeds the failed bit count threshold, identify the at least one memory die as a candidate for slow programming operations.

11. The data storage device of claim 10, wherein the one or more additional memory blocks include the selected one or more memory blocks.

12. The data storage device of claim 8, wherein identifying the at least one memory die as a candidate for slow programming operations causes the controller to perform subsequent programming operations on the at least one weak word line of the at least one memory die, and the memory blocks associated with the at least one weak word line, to be programmed at a rate that is lower than a programming rate of programming operations performed on other word lines of the at least one memory die.

13. A non-volatile storage device, comprising:
one or more memory dies;
means for identifying one or more weak word lines associated with each of the one or more memory dies;
means for selecting one or more memory blocks associated with each of the one or more weak word lines;
means for determining a performance metric associated with each of the one or more weak word lines and the associated one or more memory blocks;
means for identifying the one or more weak word lines of the at least one memory die of the one or more memory dies as a candidate for slow programming operations based, at least in part, on a determination that the performance metric associated with each of the one or more weak word lines of the at least one memory die exceeds a performance metric threshold; and
means for performing programming operations on the one or more weak word lines of the at least one memory die, and the memory blocks associated with the one or more weak word lines, wherein the means for performing programming operations performs the programming operations on the one or more weak word lines of the at least one memory die at a rate that is lower than a programming rate of programming operations performed on other word lines of the at least one memory die.

14. The non-volatile storage device of claim 13, further comprising means for monitoring a number of programming operations performed on each memory die of the one or more memory dies.

15. The non-volatile storage device of claim 14, wherein determining the performance metric associated with each of the one or more weak word lines and the associated one or more memory blocks occurs based, at least in part, on the means for monitoring determining that the number of programming operations performed on at least one memory die of the one or more memory dies exceed a threshold.

16. The non-volatile storage device of claim 13, further comprising means for monitoring programming operations performed on the at least one memory die of the one or more memory dies based, at least in part, on a determination that the performance metric associated with each of the one or more weak word lines and the associated one or more memory blocks of the at least one memory die is below the performance metric threshold.

17. The non-volatile storage device of claim 13, wherein the performance metric is a failed bit count associated with the one or more weak word lines and the associated one or more memory blocks.

18. The non-volatile storage device of claim 13, wherein the lower programming rate is associated with threshold voltage distribution that is more narrow when compared to a threshold voltage distribution of the programming rate of programming operations performed on other word lines of the at least one memory die.

19. The non-volatile storage device of claim 13, wherein the performance metric is a number of program/erase (P/E) cycles associated with the non-volatile storage device.

20. The method of claim 1, further comprising adjusting a frequency at which the performance metric of each of the one or more weak word lines and the associated one or more memory blocks is determined.

* * * * *